United States Patent [19]

Babirad et al.

[11] Patent Number: 4,971,424

[45] Date of Patent: Nov. 20, 1990

[54] RADIATION CURABLE CLADDING COMPOSITIONS

[75] Inventors: Stefan A. Babirad, Minneapolis; Steven M. Heilmann, Afton; Larry R. Krepski, White Bear Lake; Jerald K. Rasmussen, Stillwater, all of Minn.

[73] Assignee: Minnesota Mining and Manufacturing Co., St. Paul, Minn.

[21] Appl. No.: 427,829

[22] Filed: Oct. 26, 1989

[51] Int. Cl.$^5$ .............................. G02B 1/04; G02B 6/16
[52] U.S. Cl. .................. 350/96.34; 526/248; 560/172
[58] Field of Search .................. 350/96.29–96.34; 526/242, 246, 248; 560/172

[56] References Cited

U.S. PATENT DOCUMENTS

| | | | |
|---|---|---|---|
| 3,999,834 | 12/1976 | Ohtomo et al. | 350/96.33 X |
| 4,504,641 | 3/1985 | Nochumson | 526/238.2 |
| 4,505,543 | 3/1985 | Ueba et al. | 350/96.34 |
| 4,511,209 | 4/1985 | Skutnik | 350/96.34 |
| 4,542,200 | 9/1985 | Nochumson | 526/238.2 |
| 4,544,235 | 10/1985 | Nishida et al. | 350/96.34 |
| 4,557,562 | 12/1985 | Ohmori et al. | 350/96.34 |
| 4,660,923 | 4/1987 | Ohmori | 350/96.34 |
| 4,681,925 | 7/1987 | Strepparola et al. | 526/246 |
| 4,687,295 | 8/1987 | Koishi et al. | 350/96.34 |
| 4,720,428 | 1/1988 | Ohmori et al. | 428/373 |
| 4,804,246 | 2/1989 | Kobayashi et al. | 350/96.34 |
| 4,830,910 | 5/1989 | Larson | 428/336 |
| 4,836,642 | 6/1989 | Matsumoto et al. | 350/96.34 |
| 4,873,140 | 10/1989 | McIntyre | 428/343 |

FOREIGN PATENT DOCUMENTS

| | | |
|---|---|---|
| 0128516 | 12/1984 | European Pat. Off. . |
| 0239935 | 10/1987 | European Pat. Off. . |
| 0243605 | 11/1987 | European Pat. Off. . |
| 0257863 | 3/1988 | European Pat. Off. . |

OTHER PUBLICATIONS

L. L. Blyler et al., "Polymers for High Technology" ACS Symp. Ser. 346, Chapt. 34 (1987).
W. B. Beck et al., "Laser Focus/Electrooptics", pp. 90–96 (Dec. 1984).
B. J. Skutnik et al., Mat. Res. Symp. Proc., 1987, 88, 27–34.

*Primary Examiner*—John D. Lee
*Attorney, Agent, or Firm*—Donald M. Sell; Walter N. Kirn; Lorraine R. Sherman

[57] ABSTRACT

Novel optical fiber cladding compositions containing fluorinated acrylamide monomers are described. The claddings are liquids at room temperature which possess excellent coating viscosities in the pre-polymerized state and are polymerized by actinic radiation.

21 Claims, 1 Drawing Sheet

RADIATION CURABLE CLADDING COMPOSITIONS

FIELD OF THE INVENTION

This invention relates to cladding compositions that are curable by actinic radiation. In another aspect, it relates to an article such as an optical fiber or waveguide comprising the cured cladding composition surrounding or covering a siliceous or polymeric core.

BACKGROUND OF THE INVENTION

Optical fibers and waveguides in their simplest construction consist of a so-called core material through which the majority of the optical information passes and, surrounding the core, a cladding material which transmits some of the light but whose principal function is to restrict the optical information to the core region of the construction.

Core materials have been either siliceous (glass) or organic polymer in nature. While certain advantages, such as outstanding flexural strength, ease of processing, and facile connectorization attend organic polymer cores, glass cores are virtually unchallenged in their ability to transmit optical information with a low degree of attenuation or loss. Therefore, considerable effort has been made in the art to utilize glass cores despite obvious drawbacks such as brittleness, moisture sensitivity, and extreme processing conditions.

Effective cladding materials exhibit low refractive indices and low moisture vapor transmission rates. Fluorinated polymer claddings have been described to meet these criteria on both organic polymer cores (for example, in U.S. Pat. Nos. 4,505,543; 4,544,235; 4,557,562; 4,660,923; 4,687,295; and 4,836,642) and glass cores (for example, in Eur. Pat. Appl. No. 128,516; Eur. Pat. Appl. No. 239,935; U.S. Pat. Nos. 4,720,428 and 4,804,246.). A problem with these fluorinated polymer systems, however, is that they are applied to the core material either from solution which can be polluting and requires complete outgassing of even the last traces of solvent for optimum performance or are melt extruded onto the core which can be very physically damaging to the surface of the core.

An innovation in the fiber optics industry was put forth by Skutnik in U.S. Pat. No. 4,511,209 describing so-called "hard clad silica" (HCS) fibers that were cured by ultraviolet light. Earlier approaches to UV curable cladding/buffer materials had stressed that the cladding or primary coating should be very elastomeric and possess a low modulus, while the buffer or secondary protective coating should be a tough, high modulus material. These precepts for so-called "plastic clad silica" (PCS) fibers usually involved very low modulus silicone cladding materials and are described, for example, by L. L. Blyler, Jr., et al., "Polymers for High Technology", ACS Symp. Ser. 346, edited by M. J. Bowden and S. R. Turner, published by the American Chemical Society: Washington, D.C., Chapter 34, 1987. In contrast, HCS fibers (further described by W. B. Beck and M. H. Hodge, "Laser Focus/Electrooptics", pp. 90-96 (1984) and by B. J. Skutnik, et al., *Mat. Res. Symp. Proc.*, 1987, 88, 27) feature a hard polymer cladding that is chemically bonded to the glass core. HCS fibers feature high core-to-clad diameter ratios which facilitate physical coupling of fibers and reduce microbending losses. Additionally, the chemical bond between core and clad increases fiber strength and minimizes the corrosive effects of water. HCS UV curable cladding compositions of U.S. Pat. No. 4,511,209 comprise (i) at least 50 weight percent of a highly fluorinated monofunctional acrylate with a refractive index below 1.38; (ii) a polyfunctional acrylate crosslinking agent; (iii) a mono or polyfunctional thiol synergist (some of which are alkoxysilane-functional and provide a covalent bond to the glass core); and (iv) a photoinitiator.

There are several disadvantages with the above system, perhaps the greatest being low viscosity. The major component, the fluorinated acrylate monomer, is either a liquid with a water-like viscosity or a solid that requires a solvent or melting in order to coat. Coating such a low viscosity liquid creates essentially a cylindrical column of liquid. This is an unstable situation and leads to a common problem in the industry known as "beading" of the coating which is totally unacceptable for a cladding material. Another disadvantage with the HCS fibers of U.S. Pat. No. 4,511,209 is the adhesion promoting alkoxysilane "synergist" requires outgassing of an alcohol which is created in the reaction with a silanol group on the core. Such outgassing can create voids which are detrimental to optical performance. Furthermore, the alkoxysilane-silanol condensation reaction leads to an overall increase in the densification of the cladding, i.e., a net shrinkage in volume occurs from about 25% to as much as 50% in volume at the critical core/cladding interface. This shrinkage is detrimental to adhesion and to the physical integrity of the cladding material.

An effort to improve the viscosity characteristics of a UV curable cladding composition was made by Kamei and Umaba in Eur. Pat. Appl. 243,605. This patent application teaches use of (i) a fluorine-containing polymer, (ii) a fluorine-containing monomer, (iii) a non-fluorine-containing monomer, and (iv) a polyfunctional crosslinking monomer. The increased viscosity of the overall formulation is accomplished by the presence of the fluorinated polymer component. A major problem with this system, however, is that low refractive index is sacrificed somewhat by dilution with relatively high refractive index, non-fluorinated monomers. The non-fluorinated components are required largely because fluorinated monomers themselves are relatively poor solvents, even for relatively low concentrations of polymers derived from them.

Eur. Pat. Appl. 257,863 relates to UV curable cladding compositions comprising low viscosity components.

SUMMARY OF THE INVENTION

Briefly, the present invention provides curable coating compositions which comprises at least one fluorinated acrylamide monomer and at least one ethylenically unsaturated crosslinking monomer different from said acrylamide monomer. In another aspect, the curable coating composition further comprises at least one of a fluorinated acrylate monomer, a nonfluorinated ethylenically unsaturated monomer different from said crosslinking monomer, and an ethylenically unsaturated adhesion promoting monomer different from any other monomer in the composition of matter. The compositions are viscous liquids at ambient temperatures of 20°–30° C. and are useful as cladding materials for optical fibers and waveguides.

In yet another aspect, the present invention provides novel cladding materials which result from the free radical polymerization reaction of the aforementioned coating compositions.

The curable coating compositions of the invention contain no inert solvents that must be removed from the resultant cladding and yet are viscous fluids at temperatures between 20° and 30° C. The compositions possess a moderately high viscosity (i.e., in the range of 10 to 2500 cP) to facilitate precision coating. Furthermore, when exposed to actinic radiation, the compositions polymerize at high rates facilitating production line speeds and yield cladding materials which possess very low refractive indices, are transparent and colorless, and have improved light accepting and transmitting abilities. The cladding materials of the invention strongly adhere to an information transmitting component (i.e., core, grating, or support) without undergoing extensive shrinkage in the process and are amorphous and relatively optically transparent. They are toughened coatings capable of withstanding normal handling and subsequent processing operations.

In this application:

"acrylamide" and "acrylate" are used in a generic sense and mean not only derivatives of acrylic acid, but also methacrylic and other modified acrylic acids including both so-called acryloyl, i.e., 2-propenoyl, and methacryloyl, i.e., 2-methyl-2-propenoyl, amine and alcohol derivatives;

"alkyl" and "alkylene" mean the monovalent and divalent residues remaining after removal of one and two hydrogen atoms, respectively, from a linear or branched chain hydrocarbon having 1 to 20 carbon atoms;

"lower alkyl" means $C_1$ to $C_4$ alkyl;

"aryl" means the monovalent residue remaining after removal of a hydrogen atom from an aromatic compound (single ring and multi-and fused-ring) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$;

"azlactone" means 2-oxazolin-5-one groups of Formula I and 2-oxazin-6-one of Formula II:

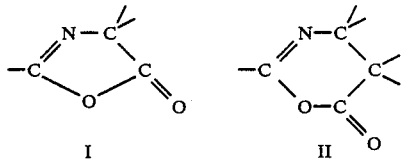

"cycloalkyl" means the monovalent residue remaining after removal of a hydrogen atom from a cyclic hydrocarbon having 3 to 12 carbon atoms;

"substantially perfluorinated" means hydrocarbon groups in which at least 50 percent of the hydrogen atoms have been replaced by fluorine; and "core" means a fibril, a grating, a surface, or any other solid medium through which optical information can be transmitted.

Cladding materials are essential components of an optical fiber or waveguide, and design of proper materials can often compensate for the disadvantages of the glass cores. The most important requirement for an effective cladding which is provided by the present invention is that its refractive index be lower than that of the core material. This requirement derives from Snell's Law and the consequence that as electromagnetic radiation passes from a medium of high refractive index into a medium of low refractive index the path of the light is deviated, i.e., refracted, away from a 90° angle (the normal angle) between the two media. This then allows incident light at angles other than 0° to be transmitted along the fiber path by total internal reflection The maximum angle of incident light that will be accepted by the core is called the critical angle Generally it is desirable to have as large a difference as possible between the refractive indices of core and clad, not only so that larger angles of incident light will be accepted but also because organic polymer claddings generally undergo greater volume contraction with decreasing temperatures than glass cores. Since refractive index is directly related to density changes, it is desirable to have a cladding with as low an index as possible so that the construction will function properly at very low operating temperatures.

Another important feature of a cladding material that is demonstrated by the present invention is good adherence to the core material Movement or so-called "pistoning" of the core within the cladding is very undesirable from both practical and performance viewpoints. When adhesion between cladding and core is poor, it is very difficult to effectively connect two optical fibers, an important practical consideration. The slippage also causes abrasion which changes the interface and can actually expose the core material. With glass cores, water, either in liquid form or vapor form in the atmosphere, could interact with the exposed glass causing optical and physical deterioration of the fiber The present invention provides a high level of adhesion between cladding and core, and the inherent differences in thermal expansion between cladding and core materials do not cause significant changes or optical losses over a range of temperatures.

The cladding materials of the present invention have a low moisture vapor transmission rate which is especially important for glass cores or supports As was noted above, migration of water to the cladding-core interface causes a significant loss in performance. Water either becomes physically adsorbed or actually engages in a chemical reaction with the siliceous core surface forming silanol groups. Both physically adsorbed water and generation of silanol groups through chemical reaction are very disadvantageous as they can adversely affect adhesion, tensile strength, and optical transmission of the core.

From a physical standpoint, the cladding material should be non-tacky and sufficiently tough so that physical integrity is maintained under normal handling and operating conditions. Even though the cladded core assembly is usually covered with an additional protective coating called a "buffer", the buffer is not always applied immediately, i.e., in line with the cladding application. Therefore, a cladding material possessing considerable physical integrity is highly desirable. Also, as a consequence of applying the buffer coating, the cladding must be tolerant of buffer application conditions which are often thermal extrusion operations conducted at temperatures as high as 300° C.

A further physical requirement of the cladding is that it be reasonably optically transparent in accordance with the requirement of Blyler et al., infra. While a major portion of the optical information is transmitted within the core by total internal reflection, a minor portion (optical information incident at the critical angle and also because some of the optical information passes into the cladding region prior to reflection) is transmitted within the cladding itself. Blyler and Alosio (CHEMTECH, 1987, 680) indicate that cladding losses should be below 1000 dB/km. This requires clear, colorless, amorphous polymer claddings.

A thorough discussion of many facets of optical fibers is contained in books edited by S. E. Miller and A. G. Chynoweth ("Optical Fiber Telecommunications", Academic Press: New York, 1979) and by J. C. Palais ("Fiber Optic Communications", 2nd edition, Prentice Hall: Englewood Cliffs, N.J., 1988).

DETAILED DESCRIPTION OF PREFERRED EMBODIMENTS

Figure 1:
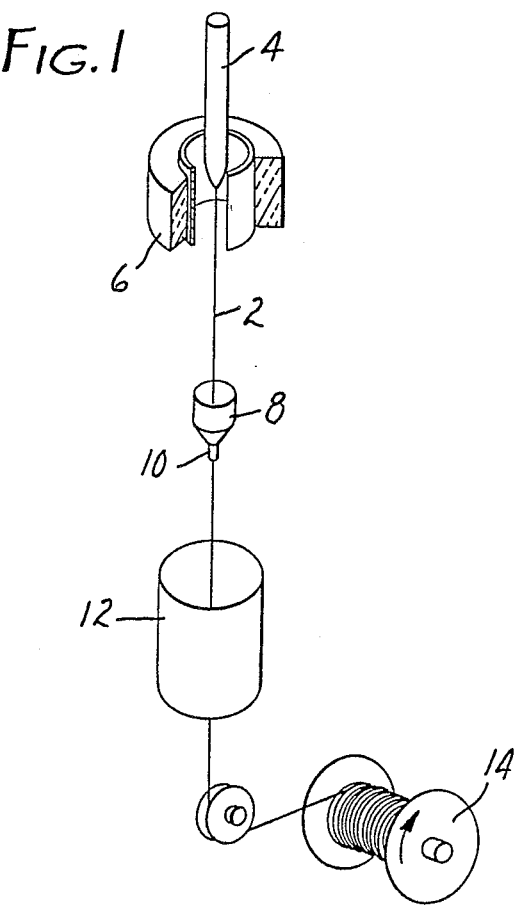
FIG. 1 illustrates an apparatus for preparing a coated optical fiber of the invention.

The present invention provides curable coating compositions comprised of 100 parts by weight of ethylenically unsaturated monomers which comprise (1) from 10 to 99 parts, preferably 40 to 96 parts, of at least one fluorinated acrylamide monomer of Formula III

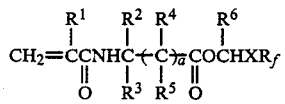

wherein $R^1$ and $R^6$ are independently hydrogen or methyl;

$R^2$ and $R^3$ independently can be an alkyl, cycloalkyl, or aryl group, or $R^2$ and $R^3$ taken together with the carbon to which they are joined can form a carbocyclic ring containing 4 to 12 ring atoms;

$R^4$ and $R^5$ are independently hydrogen or lower alkyl;

a is 0 or 1;

X is a carbon-to-carbon single bond (sb), $CH_2$, $CH_2OCH_2$, or $CH_2CH_2OCH_2$; and $R_F$ is a substantially perfluorinated alkyl, cycloalkyl, or aryl group; preferably $R_F$ is fully fluorinated;

(2) from 0 to 88 parts, preferably 0 to 50 parts, of at least one fluorinated acrylate monomer of Formula IV

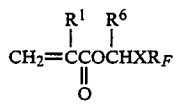

wherein $R^1$, $R^g$, $R_F$, and X are as defined above;

(3) from 0 to 50 parts, preferably 10 to 30 parts, of at least one non-fluorinated monomer;

(4) from 1 to 15 parts, preferably 2 to 5 parts, of at least one crosslinking monomer; and (5) from 0 to 10 parts, preferably 2 to 5 parts, of at least one adhesion promoting monomer.

The invention provides novel claddings for siliceous cores and transparent organic polymer cores and substrates which are useful for transmitting optical information. Representative polymer cores and supports include poly(methyl methacrylate), poly(styrene), and poly(carbonates). The cladding materials are the free radical polymerization products of the above described coating compositions.

Fluorinated acrylamide monomers of Formula III include those described in assignee's copending patent application Ser. No. 07/267,186 (now U.S. Pat. No. 4,931,582) which is incorporated herein by reference. Preferred monomers are liquids at 20° to 30° C. and include those listed in Table 1, below.

TABLE 1

Preferred Fluorinated Acrylamide Monomers of Formula III

| Sample | $R^1$ | $R^2$ | $R^3$ | a | $R^4$ | $R^5$ | $R^6$ | X | $R_F$ |
|---|---|---|---|---|---|---|---|---|---|
| 1 | H | Me | Me | 0 | — | — | Me | $CH_2OCH_2$ | $CF_3(CF_2)_6$ |
| 2 | H | Me | Et | 0 | — | — | H | sb | $CF_3(CF_2)_6$ |
| 3 | H | Me | Me | 1 | H | H | H | sb | $CF_3(CF_2)_6$ |
| 4 | H | Me | Me | 0 | — | — | H | $CH_2OCH_2$ | $CF_3(CF_2)_6$ |
| 5 | H | Me | Et | 0 | — | — | H | $CH_2$ | $CF_3(CF_2)_6$ |
| 6 | H | Me | Me | 1 | H | H | H | sb | $H(CF_2)_6$ |
| 7 | H | Me | Et | 0 | — | — | H | sb | $H(CF_2)_6$ |

Me = methyl; Et = ethyl; sb = single bond

An especially preferred fluorinated acrylamide monomer is that of sample 4 in Table 1 above. As is also apparent to one skilled in the art, mixtures of the liquid fluorinated acrylamide monomers and minor amounts, i.e., less than 50 percent of the fluorinated monomers, of other crystalline fluorinated acrylamide monomers having melting points greater than 30° C. specified in patent application Ser. No. 07/267,186 (U.S. Pat. No. 4,931,582) may be utilized.

Fluorinated acrylate monomers of Formula IV include those listed in Table 2.

TABLE 2

Representative Fluorinated Acrylate Monomers of Formula IV

| Sample | $R^1$ | $R^6$ | X | $R_F$ |
|---|---|---|---|---|
| 1 | H | H | sb | $H(CF_2)_{10}$ |
| 2 | H | H | sb | $CF_3(CF_2)_6$ |
| 3 | $CH_3$ | H | sb | $CF_3(CF_2)_6$ |
| 4 | H | H | CH | $CF_3(CF_2)_7$ |
| 5 | H | H | CH | $N(Bu)SO_2C_7F_{15}$ |
| 6 | H | H | sb | $CF_3(CF_2)_2$ |
| 7 | H | H | sb | $CF_3$ |
| 8 | $CH_3$ | H | sb | $CF_3$ |
| 9 | H | H | sb | $c$-$C_6F_{11}$ |
| 10 | $CH_3$ | H | sb | $c$-$C_6F_{11}$ |
| 11 | H | H | $CH_2OCH_2$ | $CF_3(CF_2)_6$ |
| 12 | $CH_3$ | H | $CH_2OCH_2$ | $CF_3(CF_2)_6$ |

Bu = butyl; c = cyclo

A preferred fluorinated monomer is that of sample 9 in the Table 2.

Useful non-fluorinated monomers include styrene and monofunctional acrylate esters (up to 20C's) such as butyl acrylate, ethyl acrylate, methyl acrylate, methyl methacrylate, 2-ethylhexyl acrylate, cyclohexylmethyl acrylate, and phenethyl acrylate. Preferred non-fluorinated monomers are ethyl acrylate and methyl methacrylate.

Useful crosslinking monomers include polyfunctional acrylic acid esters such as 1,2-ethylenediacrylate, 1,6-hexanediol diacrylate, 1,4-butanediol diacrylate, trimethylolpropane triacrylate, and pentaerythritol tetraacrylate, with 1,4-butanediol diacrylate being preferred.

The adhesion promoting monomers of the invention are of two kinds: (1) those which promote adhesion between cladding and glass and, to a lesser extent, organic polymer cores by relatively weak attractive forces such as Van der Waals and dipole-dipole interactions; and (2) those which promote adhesion between cladding and glass cores by a strong covalent bond. Adhesion promoting monomers of the first kind include polar ethylenically unsaturated monomers such as acrylic acid, N,N-dimethylacrylamide, hydroxyethyl acrylate, and hydroxybutyl vinyl ether. Adhesion promoting monomers of the second kind which are preferred with glass cores include the trialkoxysilylalkyl acrylic monomers such as trimethoxysilylpropyl methacrylate, and especially preferred are the 2-alkenyl azlactones such as 2-vinyl-4,4-dimethylazlactone (the reaction of silanols and azlactones having been first described in U.S. Pat. No. 4,852,969). The adhesion promoting monomer is indicated to be an optional component of the invention primarily because with organic polymer cores such as poly(methyl methacrylate) there is no real capability of covalent binding with the cladding. With these systems, however, a reasonable degree of adhesion derives from the ester-ester dipolar attractive interactions inherently present between, for example, an acrylic core and acrylic cladding material, and incorporation of an adhesion promoting monomer provides only a modest benefit.

Actinic radiation necessary for the polymerization of the monomeric cladding compositions to form the polymeric cladding compositions of the invention can be supplied in two forms: high energy electrons (emitted from commercial electron beam generators) and ultraviolet light. With ultraviolet light another component is generally necessary for the light to be absorbed and for polymerization to be initiated. These latter functions are most commonly accomplished by addition of a so-called photoinitiator to the system in a concentration range of from 0.1 to 5.0 percent, preferably 1.0 to 3.0 percent, by weight (based on polymerizable monomers). Useful photoinitiators include acyloins and acyloin ethers which are commercially available.

The viscosity of the monomeric cladding compositions is an important parameter and one readily addressable by the compositions of this invention. Problems associated with cladding compositions which possess low viscosities, e.g., less than 10 cP, such as physical defects caused by inadequate wetting and beading have already been discussed at some length. The ability to coat cladding compositions possessing increased viscosities not only leads to elimination of these problems but also offers the manufacturer the latitude of applying a cladding of increased thickness thereby offering a range of products with varying core/clad ratios. The viscosity of the monomeric cladding compositions can be too high, however. A consequence of coating compositions with viscosities greater than 2500 cP is that exchange of oxygen which inhibits free radical polymerization by an inert gas such as nitrogen is relatively slow. This problem is especially pronounced with perfluorinated monomers which dissolve relatively large quantities of oxygen. Because of this slow exchange it is necessary to increase outgassing time and exposure time to actinic radiation and consequently reduce production speeds. We have determined that the range of viscosities useful in the invention should be greater than 10 cP for optimal coating characteristics but less than 2500 cP in order to achieve high production rates, preferably between 30 and 2000 cP, most preferably between 50 and 1500 cP.

The cladding compositions may also comprise a thermal stabilizer/antioxidant. Optical fibers must retain a high level of signal transmitting capability over a relatively wide operating temperature range and must pass a stringent cold/hot temperature cycling test. The optical fibers are kept at −65° C. for four hours and monitored as a function of loss in dB/Km. The fibers are then brought back to room temperature for two hours and thereafter held at +125° C. for four hours. Again the temperature is brought to ambient for two hours and the loss of the optical fiber is recorded. It has been found that the presence of up to 5%, generally 0.001% to 5%, preferably 0.01 to 1% by weight of one or more thermal stabilizers/antioxidants compatible with the cladding composition provides improved stability to the cold/hot cycling test. Suitable stabilizers/antioxidants include low melting hindered phenols and thioesters. Specific examples include 2,6-di-tert-butyl-4-methylphenol commercially available under the trade name Ultranox 226 TM (Borg-Warner Chemicals, Inc., Parkersburg, N.Y.), octadecyl-3,5-di-tert-butyl-4-hydroxyhydrocinnamate commercially available under the trade names Isonox TM 132 (Schenectady Chemicals, Inc., Schenectady, N.Y.) or Vanox TM 1320 (Vanderbuilt Co., Inc., Norwalk, Conn.) and dilauryl thiodipropionate commercially available under the trade name Cyanox LTDP TM (American Cyanamid Co., Wayne, N.J.). A combination of thioester and hindered phenol has proven to be particularly effective.

The core of the optical fibers of the invention is preferably an inorganic glass, more preferably fused silica, but may optionally be a synthetic polymer. The cladding composition is selected to provide a refractive index lower than that of the core, preferably at least 0.03 units less, more preferably at least 0.05 units less than the refractive index of the core. Typically cores have diameters in the range of 100 to 600 micrometers. Claddings can range in thickness from 10 to 100 micrometers.

The optical fibers of the present invention may be prepared by conventional techniques employing the cladding compositions of the invention. A low loss of optical information is desired. It is preferred that optical losses of cladding fibers of the invention be less than 10 dB/km for siliceous cores and less than 1000 dB/km for polymeric cores.

The accompanying drawing illustrates a suitable apparatus for preparing a coated optical fiber in accordance with the invention.

A glass fiber 2 is drawn from a pure glass preform 4 held in a furnace 6 on a standard glass drawing tower. The tower is provided with a coating station comprising a coating cup 8 containing the cladding composition and the metering die 10. The coated fiber is passed immediately through an ultraviolet curing station 12 where it is photopolymerized and cooled on a take-up spool 14. A typical fiber will have an overall diameter of 200 micrometers and a cladding thickness of 10 micrometers.

The optical fibers of the invention may also possess a protective layer such as those known in the art. For example, a protective coating of a fluoropolymer may be coated by passing the clad fiber through a melt of the fluoropolymer. A suitable fluoropolymer is commercially available from Dupont (Wilmington, Del.) under the tradename Tefzel TM 210.

The polymeric claddings of the present invention are useful in optical fiber waveguides for transmitting data. Information transfer using a modulated light beam guided by the optical fibers of the present invention can have application including telecommunications and computer link-up and data base use. These optical fiber linkages have advantages compared to metal wires carrying electrical signals in that they have a very high information carrying capacity and are free from external interference.

Objects and advantages of this invention are further illustrated by the following examples, but the particular materials and amounts thereof recited in these examples, as well as other conditions and details, should not be construed to unduly limit the invention.

EXAMPLE 1

Preparation of 1H,1H,2H,2H,4H,4H-3-Oxaperfluoroundecan-1-ol

In a three liter, round-bottomed flask equipped with a mechanical stirrer, thermometer, and condenser/gas bubbler arrangement were charged 1,1-dihydroperfluoro-1-octanol (available from 3M, St. Paul, Minn.) (2326 grams; 5.815 moles), ethylene carbonate (available from Jefferson Chemical Co., Bellaire, Tex.) (768 grams; 8.72 moles), and tetramethylammonium iodide (available from Aldrich Chemical Co., Milwaukee, Wis.) (23.3 grams; 0.116 mole). The mixture of solids was warmed to about 90° C. to achieve a homogeneous light brown solution. Warming was continued, and the color of the reaction mixture lightened noticeably at 110° C. At 115° C. gas evolution was observed, and the temperature was slowly raised to 140° C. over the next few hours so that gas evolution did not become uncontrollably fast.

Gas evolution continued for about 48 hours, at which point gas liquid partition chromatography (glpc) analysis showed that less than 5 percent of the starting alcohol remained, about 90 percent of one higher boiling component was present, with only about 5 percent of a still higher boiling component (presumably dialkylated or acylated material) being detected. The reaction mixture was cooled and poured into a separatory funnel containing 2400 mL of ether and 2400 mL of water. The organic layer was separated and dried over anhydrous magnesium sulfate, and the ether was removed using a rotary evaporator. The residue was vacuum fractionally distilled.

Material distilling at 65°-66° C./0.7 Torr. was collected and was analyzed to be greater than 97 percent pure by glpc. The structure of the title compound was corroborated by IR, $^1$H-NMR, and $^{13}$C-NMR spectroscopy. The fraction weighed 1761 grams which represented a 68 percent yield based on starting alcohol.

Preparation of 1H,1H,2H,2H,4H,4H-3-Oxaperfluoroundecyl 2-Acrylamido-2-methylpropionate To 994.8 grams (2.24 moles) of the above O-hydroxyethylated alcohol contained in a two liter, three neck, round-bottomed flask equipped with a condenser, mechanical stirrer, and thermometer were added 311.4 grams (2.24 moles) of 2 vinyl-4,4-dimethylazlactone (VDM) (available from SNPE, Inc., Princeton, N.J.). 1,8 Diazabicyclo[5.4.0]undec-7-ene (DBU) (available from Aldrich Chemical Co., Milwaukee, Wis.) (0.75 gram; 0.005 mole) was added to the colorless reactant solution. The reaction temperature increased slowly to 75° C., and the viscosity of the solution was noticeably increased. After three hours of stirring, the reaction temperature returned to ambient. IR, $^1$H-NMR, and $^{13}$C-NMR spectroscopy corroborated the title structure of the product and indicated that the material was exceptionally pure. The viscosity of the fluorinated acrylamide was about 2690 cP at 22° C.

Preparation of an Optical Fiber Containing a Glass Core

The following monomeric cladding composition was prepared using the fluorinated acrylamide prepared above:

| fluorinated acrylamide | 96 grams |
|---|---|
| 1,4-butanediol diacrylate | 2 grams |
| vinyl dimethylazlactone (VDM) | 2 grams |

2,2-Dimethyl-2-hydroxyacetophenone [Darocur TM 1173 (available from EM Industries, Inc., Hawthorne, N.Y.)] (2.0 grams) was added to the composition as a photoinitiator, and the resulting solution possessed a viscosity of about 1290 cP at 22° C.

The apparatus for producing the optical fiber was a 6.7 meter (22 foot) Astro Tower equipped with an Astro Graphite Resistance Furnace (available from the Astro Division of Thermal Technologies, Santa Rosa, Calif.). The glass core material emanated from a Diasil Preform Rod (available from Mitsubishi Rayon Co., Ltd., Tokyo, Japan), and the coating station was an open cup design. Ultraviolet actinic radiation was supplied by a medium pressure mercury lamp, and irradiation of the coated monomeric cladding composition took place in an atmosphere of nitrogen; the optical fiber was produced at a constant rate of 20 meters/minute.

A 200 meter length of the optical fiber consisted of a 200 micrometer glass core and a 25 micrometer clad and exhibited a loss of 7.0 dB/Km. The loss values were obtained using a Tektronix TM 506 Optical Time Domain Reflectometer (OTDR) (available from Tektronix, Portland, OR) with the loss value at 812 nm being recorded. The principle of the OTDR measurement is discussed by D. Marcuse in his book entitled "Principles of Optical Fiber Measurements", Academic Press: New York, 1981, pp. 236-241, and the procedure utilized was that of Electronic Industries Association Standard 455-46 (May 1983).

EXAMPLE 2

The following monomer cladding composition was prepared:

| fluorinated acrylamide (Example 1) | 96 grams |
|---|---|
| 1,4-butanediol diacylate | 2 grams |
| trimethoxysilylpropyl methacrylate (available from the Union Carbide Corp., Danbury, CT) | 2 grams |

Darocur 1173 (2 grams) was again utilized as the photoinitiator, and the viscosity of the solution was 1187 cP at 22° C. Using the optical fiber arrangement of Example 1, a 200 meter section exhibited a loss measurement of 6.0 dB/Km.

EXAMPLE 3

| Monomers | |
|---|---|
| fluorinated acrylamide (Example 1) | 93 grams |
| 1,4-butanediol diacrylate | 5 grams |
| VDM | 2 grams |

Darocur 1173 (2 grams) was employed as the photoinitiator, and the viscosity was about 1050 cP at 22° C. A 500 meter length of an optical fiber prepared as in Example 1 exhibited a loss of 4.8 dB/Km.

EXAMPLE 4

| Monomers | |
|---|---|
| fluorinated acrylamide of Example 1 | 75.5 grams |
| perfluorocyclohexylmethyl acrylate (available from 3M, St. Paul, MN) | 20.5 grams |
| 1,4-butanediol diacrylate | 2.0 grams |
| VDM | 2.0 grams |

With 2 grams of Darocur 1173 the viscosity was 312 cP at 22° C. A 200 meter section of an optical fiber prepared as in Example 1 produced a loss measurement of 5.0 dB/Km. Application of a Tefzel buffer coating from the melt resulted in a slightly increased loss value of 9.1 dB/km.

EXAMPLE 5

| Monomers | |
|---|---|
| fluorinated acrylamide of Example 1 | 55 grams |
| perfluorocyclohexylmethyl acrylate | 41 grams |
| 1,4-butanediol diacrylate | 2 grams |
| VDM | 2 grams |

With 2 grams of Darocur 1173 the solution viscosity was about 83 cP at 22° C. An optical fiber produced as in Example 1 provided a loss value of 4.9 dB/Km for a 200 meter length.

EXAMPLE 6

Preparation of an Optical Fiber Containing an Organic Polymer Core

The following monomeric cladding composition was prepared using the fluorinated acrylamide prepared in Example 1:

| fluorinated acrylamide | 88 grams |
|---|---|
| 1,4-butane diol diacrylate | 10 grams |

Darocur 1173 (2 grams) was added to the composition as a photoinitiator, and the resulting solution possessed a viscosity of about 300 cP at 22° C.

The organic polymer core was produced using a Haake Buchler Rheomex-254 1.9 cm (25:1 length:diameter) vented barrel single screw extruder (available from Haake Buchler Instruments, Inc., Saddle Brook, N.J.). Poly(methyl methacrylate) (available from Rhom & Haas, Philadelphia, Pa.) was spun through a die slit of 0.32 cm to give a single component fiber with a diameter of about 700 microns.

The polymeric optical fiber was coated with the above UV-curable resin composition employing an open cup applicator. Ultraviolet actinic radiation was supplied by a medium pressure mercury lamp, and the irradiation of the coated monomeric cladding composition took place in an atmosphere of nitrogen.

A 45 meter length of the optical fiber consisted of a 700 micrometer polymeric core and a 70 micrometer clad and exhibited a loss of 580 dB/Km at 632 nm.

Various modifications and alterations of this invention will become apparent to those skilled in the art without departing from the scope and spirit of this invention, and it should be understood that this invention is not to be unduly limited to the illustrative embodiments set forth herein.

We claim:

1. A curable composition of matter comprising at least one fluorinated acrylamide monomer and at least one ethylenically unsaturated crosslinking monomer different from said acrylamide monomer wherein said fluorinated acrylamide monomer has the formula

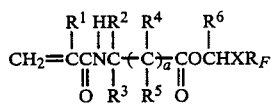

wherein
$R^1$ and $R^6$ are independently hydrogen or methyl;
$R^2$ and $R^3$ independently can be alkyl, cycloalkyl, or aryl group, or $R^2$ and $R^3$ taken together with the carbon to which they are joined can form a carbocyclic ring containing 4 to 12 ring atoms;
$R^4$ and $R^5$ are independently hydrogen or lower alkyl;
$a$ is 0 or 1;
X is a carbon-to-carbon single bond, $CH_2$, $CH_2OCH_2$, or $CH_2CH_2OCH_2$; and
$R_F$ is a substantially perfluorinated alkyl, cycloalkyl, or aryl group.

2. The composition of matter according to claim 1 wherein said fluorinated acrylamide is a liquid at a temperature in the range of 20° to 30° C.

3. The composition according to claim 2 wherein said composition has a viscosity greater than 10 cP and less than 2500 cP.

4. The composition according to claim 1 which has been cured.

5. A curable composition of matter comprising at least one fluorinated acrylamide monomer and at least one ethylenically unsaturated crosslinking monomer different from said acrylamide monomer, said composition further comprising at least one of a fluorinated acrylate monomer, a nonfluorinated ethylenically unsaturated monomer different from said crosslinking monomer, and an ethylenically unsaturated adhesion promoting monomer different from any other monomer in the composition of matter.

6. The composition of matter according to claim 5 wherein said fluorinated acrylate monomer has the formula

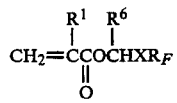

wherein $R^1$, $R^6$, $R_F$ and X are as previously defined.

7. The composition of matter according to claim 5 wherein said nonfluorinated monomer is selected from the group consisting of styrene and monofunctional acrylate esters.

8. The composition of matter according to claim 5 wherein said crosslinking monomer is selected from the group consisting of polyfunctional acrylic acid esters.

9. The composition of matter according to claim 5 wherein said adhesion promoting monomer is selected from the group consisting of 2-alkenyl azlactones and trialkoxysilylalkylacrylic monomers.

10. The composition of matter according to claim 5 wherein 100 parts by weight of said composition comprises (a) 10 to 99 parts by weight of at least one fluorinated acrylamide monomer, (b) 0 to 88 parts by weight of at least one fluorinated acrylate monomer, (c) 0 to 50 parts by weight of at least one non-fluorinated monomer, (d) 1 to 15 parts by weight of at least one crosslinking monomer, and (e) 0 to 10 parts by weight of at least one adhesion promoting monomer.

11. An optical fiber comprising a core coated with a curable composition of matter comprising at least one fluorinated acrylamide monomer and at least one ethylenically unsaturated crosslinking monomer different from said acrylamide monomer wherein said fluorinated acrylamide monomer has the formula

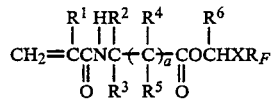

wherein $R^1$ and $R^6$ are independently hydrogen or methyl;

$R^2$ and $R^3$ independently can be alkyl, cycloalkyl, or aryl group, or $R^2$ and $R^3$ taken together with the carbon to which they are joined can form a carbocyclic ring containing 4 to 12 ring atoms;

$R^4$ and $R^5$ are independently hydrogen or lower alkyl;

a is 0 or 1;

X is a carbon-to-carbon single bond, $CH_2$, $CH_2OCH_2$, or $CH_2CH_2OCH_2$; and $R_F$ is a substantially perfluorinated alkyl, cycloalkyl, or aryl group.

12. The optical fiber according to claim 11 wherein said cladding composition further comprises at least one of a fluorinated acrylate monomer, a nonfluorinated ethylenically unsaturated monomer different from said crosslinking monomer, and an ethylenically unsaturated adhesion promoting monomer different from any other monomer in the cladding composition.

13. The optical fiber according to claim 12 wherein said fluorinated acrylate monomer in said cladding composition has the formula

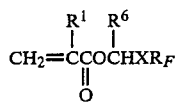

wherein $R^1$, $R^6$, $R_F$ and X are as previously defined.

14. The optical fiber according to claim 12 wherein said nonfluorinated monomer of said cladding composition is selected form the group consisting of styrene and monofunctional acrylate esters.

15. The optical fiber according to claim 12 wherein said crosslinking monomer of said cladding composition is selected from the group consisting of polyfunctional acrylic acid esters.

16. The optical fiber according to claim 12 wherein said adhesion promoting monomer of said cladding composition is selected from the group consisting of 2-alkenyl azlactones and trialkoxysilylalkylacrylic monomers.

17. The optical fiber according to claim 12 wherein 100 parts by weight of said cladding composition comprises (a) 10 to 99 parts by weight of at least one fluorinated acrylamide monomer, (b) 0 to 88 parts by weight of at least one fluorinated acrylate monomer, (c) 0 to 50 parts by weight of at least one non-fluorinated monomer, (d) 1 to 15 parts by weight of at least one crosslinking monomer, and (e) 0 to 10 parts by weight of at least one adhesion promoting monomer.

18. The optical fiber according to claim 17 wherein said cladding composition has been cured.

19. The optical fiber according to claim 11 wherein said core is selected from the group consisting of siliceous materials and transparent organic polymers.

20. The optical fiber according to claim 11 wherein said fluorinated acrylamide monomer in said cladding composition has the formula

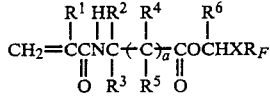

wherein $R^1$ and $R^6$ are independently hydrogen or methyl;

$R^2$ and $R^3$ independently can be an alkyl, cycloalkyl, or aryl group, or $R^2$ and $R^3$ taken together with the carbon to which they are joined can form a carbocyclic ring containing 4 to 12 ring atoms;

$R^4$ and $R^5$ are independently hydrogen or lower alkyl;

a is 0 or 1;

X is a carbon-to-carbon single bond, $CH_2$, $CH_2OCH_2$, or $CH_2CH_2OCH_2$; and $R_F$ is a substantially perfluorinated alkyl, cycloalkyl, or aryl group.

21. The optical fiber according to claim 11 wherein said coated cladding composition has been cured.

* * * * *

UNITED STATES PATENT AND TRADEMARK OFFICE
CERTIFICATE OF CORRECTION

PATENT NO. : 4,971,424
DATED : November 20, 1990
INVENTOR(S) : Stefan A. Babirad et al.

It is certified that error appears in the above-identified patent and that said Letters Patent is hereby corrected as shown below:

Col. 4, line 11, after "angle" insert -- . --.

Col. 4, line 34, after "fiber" insert -- . --.

Col. 4, line 42, after "supports" insert -- . --.

Col. 5, Formula III, delete the formula and insert therefor

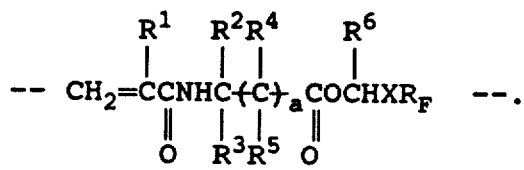

Col. 5, line 62, delete "R$^g$" and insert -- R$^6$ --.

Signed and Sealed this

Seventeenth Day of August, 1993

Attest:

BRUCE LEHMAN

*Attesting Officer*  *Commissioner of Patents and Trademarks*